(12) United States Patent
Zemel et al.

(10) Patent No.: US 8,418,604 B1
(45) Date of Patent: *Apr. 16, 2013

(54) COOKING RACK

(75) Inventors: Marc Zemel, Melville, NY (US);
Wayne B. Margolin, Kowloon (HK)

(73) Assignee: Mr. Bar-B-Q-, Inc., Old Bethpage, NY (US)

( * ) Notice: Subject to any disclaimer, the term of this patent is extended or adjusted under 35 U.S.C. 154(b) by 580 days.

This patent is subject to a terminal disclaimer.

(21) Appl. No.: 12/702,670

(22) Filed: Feb. 9, 2010

Related U.S. Application Data

(63) Continuation of application No. 11/094,705, filed on Mar. 30, 2005, now Pat. No. 7,669,523.

(51) Int. Cl.
*A47J 37/04* (2006.01)
*F24C 15/00* (2006.01)

(52) U.S. Cl.
USPC ............... 99/421 V; 99/426; 99/448; 99/449; 211/181.1

(58) Field of Classification Search ............ 99/426, 99/448, 450, 449, 416, 417, 421 V, 421 H, 99/419; 211/181.1
See application file for complete search history.

(56) References Cited

U.S. PATENT DOCUMENTS

| | | | |
|---|---|---|---|
| 2,144,278 A | 1/1939 | Wallace | |
| 2,616,360 A | 11/1952 | Thompson | |
| 2,841,288 A * | 7/1958 | Field et al. | 211/41.4 |
| 3,585,922 A | 6/1971 | Peterson | |
| 3,858,495 A | 1/1975 | Gotwalt | |
| 3,915,309 A | 10/1975 | Brazdo | |
| 4,458,585 A | 7/1984 | Erbach | |
| 4,559,869 A | 12/1985 | Hogan | |
| 4,942,862 A | 7/1990 | Alden | |
| 5,158,009 A | 10/1992 | Stewart | |
| 5,562,023 A | 10/1996 | Harrison | |
| 5,791,018 A | 8/1998 | Yoshinobu | |
| D416,165 S | 11/1999 | Zemel | |
| 6,065,394 A * | 5/2000 | Gelderman | 99/449 |
| 6,116,153 A | 9/2000 | Burrows | |
| 6,164,194 A | 12/2000 | Westmoreland | |
| 6,386,096 B1 | 5/2002 | Tiemann | |
| 6,474,224 B1 | 11/2002 | Natter | |
| 6,837,151 B2 * | 1/2005 | Chen | 99/421 H |
| 7,281,469 B1 | 10/2007 | Barbour | |

FOREIGN PATENT DOCUMENTS

GB 2232867 A 1/1991

OTHER PUBLICATIONS

Charcoal Companion Space Saver Rib Rack Box Product #SS-RR © 2000 The Companion Group.

* cited by examiner

*Primary Examiner* — Reginald L Alexander
(74) *Attorney, Agent, or Firm* — Carter, DeLuca, Farrell & Schmidt LLP

(57) ABSTRACT

A rack for positioning food slabs in a horizontal cooking area such as over a grill includes a rectangular frame which carries a plurality of bent rod food slab supports at a rearward tilt. Each support includes a pair of outer risers having interned lower ends. The outer risers extend over opposite sides of the frame, with the interned ends extending through apertures in the frame sides. Between the outer risers, the rod is bent in a digital waveform and includes forwardly extending lower cradle having upwardly sloped shoulders for engaging the bottom of a food slab. Notches are provided in the upper edge of the frame sides forwardly of each aperture and a notch engaging post extends from the cradle shoulders which are adjacent each outer riser. The ends of the frame are lapped and hinged, so that the frame may be folded along a longitudinal axis for compact storage, with the slab supports nested within the folded frame.

19 Claims, 3 Drawing Sheets

COOKING RACK

RELATED APPLICATIONS

This application is a continuation of application Ser. No. 11/094,705 filed Mar. 30, 2005 now U.S. Pat. No. 7,669,523.

BACKGROUND OF THE INVENTION

1. Field of the Invention

The present invention relates generally to cooking accessories and more specifically to a rack for efficiently positioning a plurality of food slabs.

2. Antecedents of the Invention

Various cooking accessories have been employed for positioning uncooked food items over a grill or other cooking surface. Typical examples include the rack system disclosed in U.S. Pat. No. 6,474,224, assigned to the assignee of the instant invention and the cooking basket disclosed in U.S. Pat. No. Des. 416,165, also assigned to the assignee of the present invention. It has also been proposed to lay ears of corn horizontally across a plurality of cradles formed in spaced wire supports for cooking on an outdoor barbecue grill, as shown in U.S. Pat. No. 4,942,862.

Cooking accessories have also been proposed for vertically supporting poultry as shown in U.S. Pat. No. 6,062,131, as well as corn, as shown in U.S. Pat. No. 4,458,585.

Because of geometric limitations on the quantity of foods which could be simultaneously cooked in a horizontal position, the employment of racks has been suggested for holding a plurality of uncooked food slabs in an upright position, as exemplified by U.S. Pat. No. 5,562,023 and U.S. Pat. No. 6,116,153. Certain disadvantages accompanied these prior rack systems, however. For example, the rack system of U.S. Pat. No. 6,116,153 comprised a unitary welded structure which occupied significant storage space and posed problems with respect to cleaning after usage.

The rack system disclosed in U.S. Pat. No. 5,562,023 posed similar problems with respect to its unitary structure which hindered cleaning. Further, a significant disadvantage of this rack system included the fact that slabs of uncooked food having a length less than the span between longitudinal side bars would fall through the rack.

SUMMARY OF THE INVENTION

A grilling rack for holding several slabs of food in a cooking environment, such as on a grill or in an oven, includes a rectangular frame and a plurality of bent rod food slab supports. Each support includes parallel outer risers overlying opposite sides of the frame. An interned end of each outer riser extends through an associated aperture in each side of the frame.

Between the outer risers, the slab support rod is bent into a continuous digital waveform having parallel inner risers. Each riser is joined at its top and bottom to an adjacent riser, with each riser being joined to the next adjacent riser at the top on one side and at the bottom, on the other side.

The rod is bent into horizontal stay sections joining the tops of risers and into cradle sections, joining the bottoms of risers. Each cradle section is formed with a pair of forwardly extending tines having upwardly sloped shoulders for engaging the bottom of a food slab. Adjacent shoulders are joined by stay sections.

Horizontal posts extend from the shoulders adjacent each outer riser toward the sides of the frames. The posts engage notches in the upper edges of the frame sides to fix the supports at a slight rearward tilt.

The frame is formed by two sections which are pivoted about a longitudinal axis. Each section comprises a longitudinal side and a pair of parallel end spans. Portions of the end spans of one section are lapped over portions of the end spans of the other section. Coaxial hinge pins join the lapped portions.

From the foregoing compendium, it will be appreciated that it is an aspect of the present invention to provide a rack of the general character described for positioning food slabs which is not subject to the disadvantages of the aforementioned antecedents of the invention.

It is a feature of the present invention to provide a rack of the general character described for positioning food slabs which is simple to use.

A consideration of the present invention is to provide a rack of the general character described for positioning food slabs which is relatively low in cost.

A further aspect of the present invention is to provide a rack of the general character described for positioning food slabs which is easy to clean and maintain.

Another feature of the present invention is to provide a rack of the general character described for positioning food slabs which is simple to assemble and disassemble.

Another consideration of the present invention is to provide a rack of the general character described for positioning food slabs which is well suited for economic or mass production fabrication.

A still further aspect of the present invention is to provide a rack of the general character described for positioning food slabs which can accommodate food slabs of varying lengths.

Yet another consideration of the present invention is to provide a rack of the general character described for positioning food slabs which includes bent rod slab supports having food slab rests for engaging a lower edge of a food slab.

Yet another feature of the present invention is to provide a rack of the general character described for positioning food slabs which may be disassembled for compact storage when not in use.

A still further aspect of the present invention is to provide a rack of the general character described for positioning food slabs wherein removable food slab supports are fixed in position relative to a support frame.

A further consideration of the present invention is to provide a rack of the general character described for positioning food slabs which can accommodate food slabs which are relatively small.

Other aspects, features and considerations of the present invention in part will be obvious and in part will be pointed out hereinafter.

With these ends in view, the invention finds embodiment in the various combinations of elements, arrangements of parts and series of steps by which the aforesaid aspects, features and considerations and certain other aspects, features and considerations are attained, all with reference to the following description and the accompanying drawings and the scope of which will be more particularly pointed out and indicated in the appended claims.

BRIEF DESCRIPTION OF THE DRAWINGS

In the accompanying drawings, in which is shown one of the various exemplary embodiments of the invention.

DESCRIPTION OF THE PREFERRED EMBODIMENT

Figure 1:
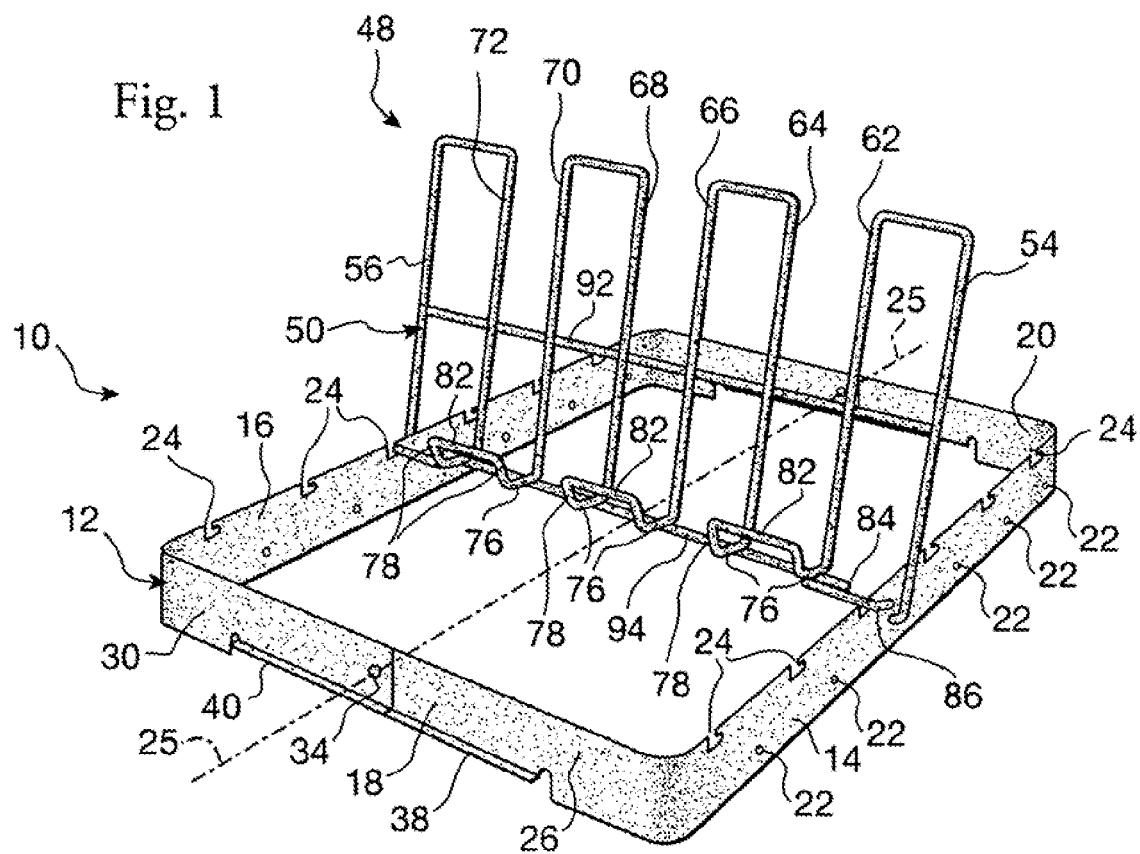
FIG. 1 is a perspective view of a cooking rack constructed in accordance with and embodying the invention and showing a frame and a food slab support, with remaining food slab supports having been omitted for clarity.

Referring now in detail to the drawings, the reference numeral 10 denotes generally a cooking rack constructed in accordance with and embodying the invention. The cooking rack 10 comprises a substantially rectangular frame 12 which may be formed of heat resistant coated sheet metal. The frame is oriented in a horizontal plane on a cooking surface, such as a grill of an outdoor barbecue or within a different cooking environment, such as in an oven.

The frame 12 includes a pair of parallel longitudinal side panels 14, 16, a front panel 18 and a rear panel 20. The side panels 14, 16, are provided with a plurality of evenly spaced apertures 22. A like plurality of notches 24 are formed in the upper perimetrical edge of each side panel 14, 16 forwardly of each aperture 22. Each aperture 22 and the closest notch 24 positioned forwardly of the aperture comprise an adjacent pair.

The frame 12 is constructed of two sections which are pivoted about a longitudinal axis 25. A first section comprises the side panel 14 as well as a pair of parallel end spans, a front end span 26 and a rear end span 28. A second section is formed of the longitudinal side panel 16 together with a front end span 30 and a rear end span 32.

Figure 2:
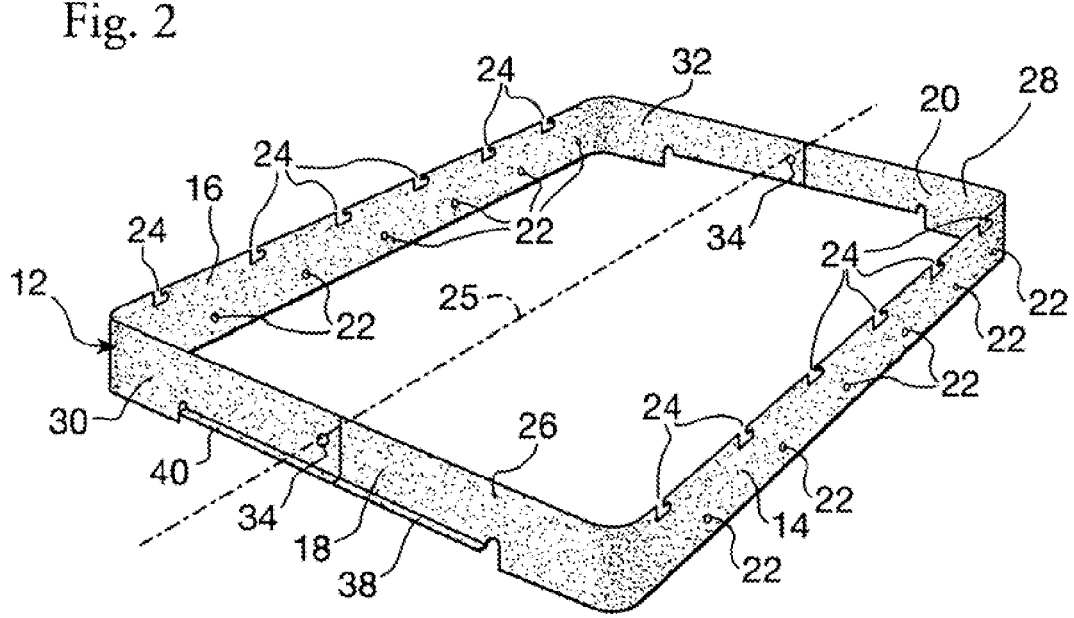
FIG. 2 is a perspective illustration of the frame, without food slab supports and prior to assembly of the cooking rack.

Accordingly, the front panel 18 is formed of the front end spans 26, 30 and the rear panel 20 is formed of the rear end spans 28, 32. It should be noted that portions of the front end spans 26, overlap one another and portions of the rear end spans 28, 32 overlap one another. Registered apertures are provided through the overlapped portions of the end spans and rivet hinge pins 34 extend through the registered apertures. As such, the sections of the frame may be pivoted about the axis 25 from a closed storage position, illustrated in FIG. 7, to an open position, illustrated in FIG. 2 for assembly of the cooking rack 10.

It should also be noted that outwardly bent flanges 38, 40, 42 and 44 are formed between notched portions in bottom edges of the end spans 26, 28, 30, 32. The flanges 38, 40, 42 and 44 serve as grasping areas for rotation of the frame sections as well as abutment stops to limit rotation of the sections in the opened and closed positions.

In accordance with the invention, a plurality of food slab supports 48 are mounted to the frame 14 to form the cooking rack 10 and position a plurality of slabs of food during cooking. The slab supports 48 are identical to one another, with each slab support 48 being mounted to the frame 12 at an associated aperture 22 and notch 24 in the respective side panels.

Figure 3:
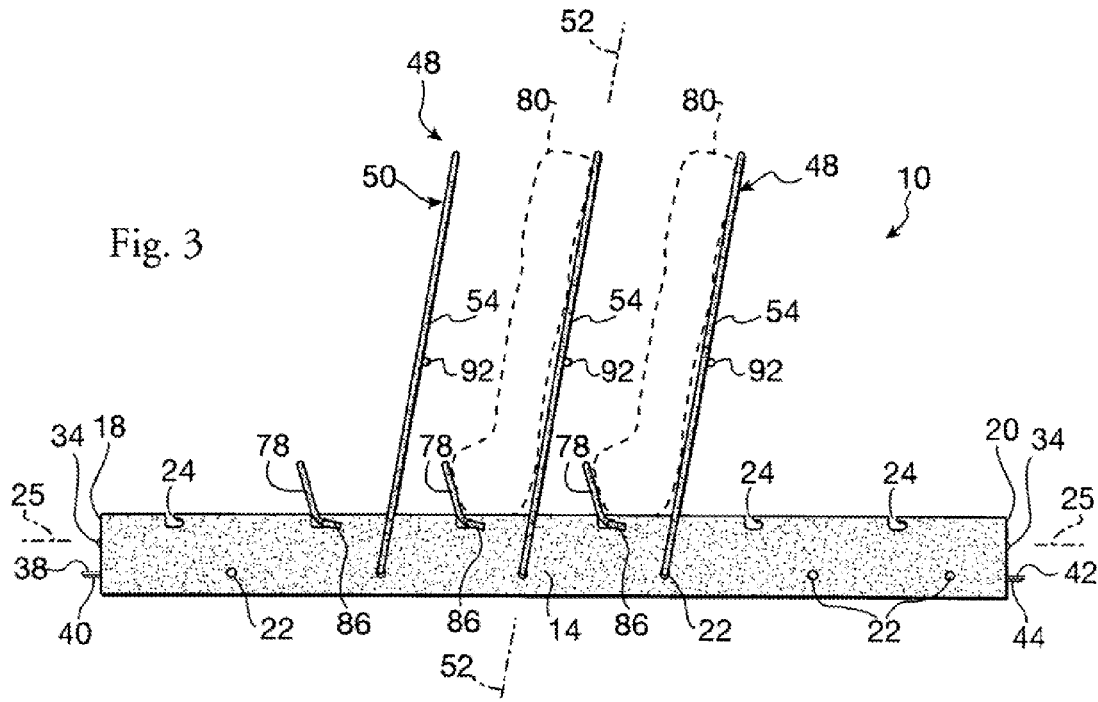
FIG. 3 is a side elevational view of the cooking rack, with some food slab supports omitted for clarity.
Figures 4, 5:
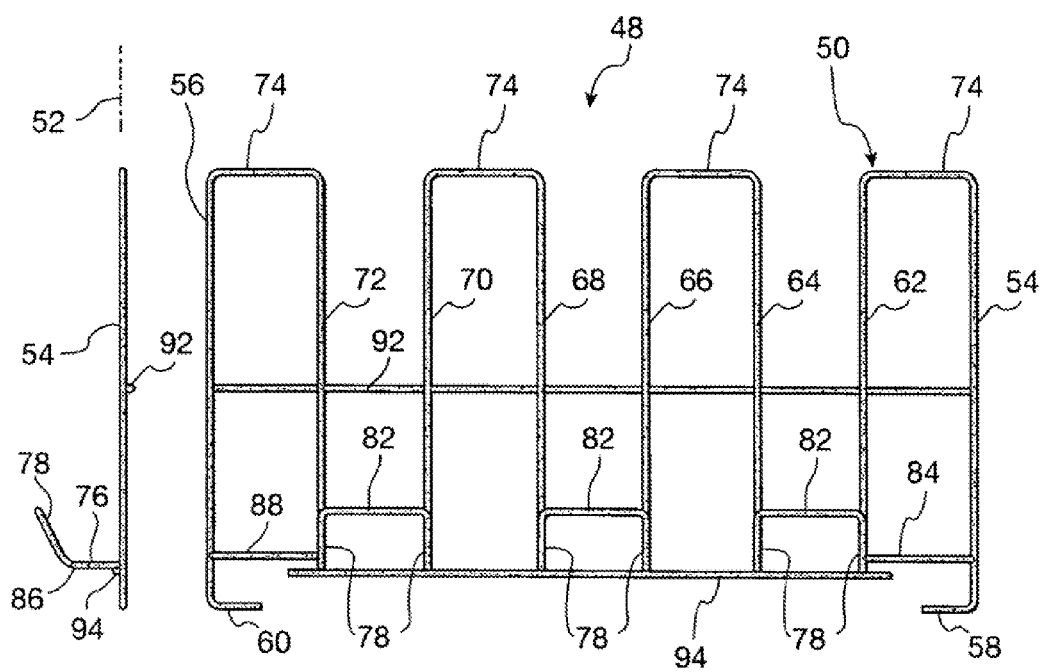
FIG. 4 is a front elevational view of a food slab support showing a bent rod configured in a digital waveform.
FIG. 5 is a side elevational view of the food slab support and illustrating a forwardly extending tine with upwardly sloped shoulder.
Figure 6:
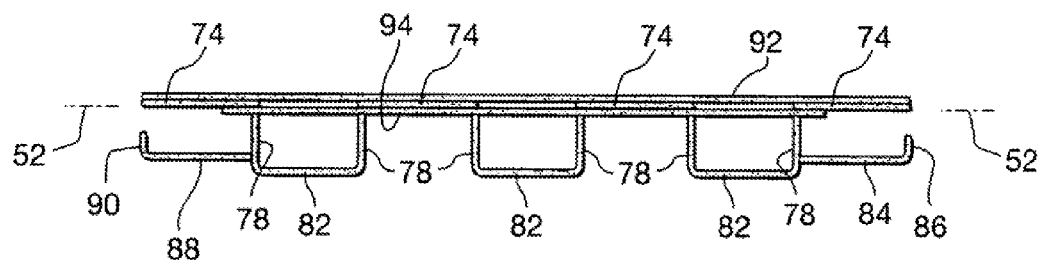
FIG. 6 is a top plan view of the food slab support, illustrating a pair of horizontal posts configured to engage slots formed in side panels of the frame.

Each slab support 48 comprises a skeletal frame formed primarily of a single bent rod 50 and lying substantially in a single plane, e.g. a plane 52, illustrated in FIG. 3, FIG. 5 and FIG. 6.

As can be seen from an observation of FIG. 1 and FIG. 4, the rod 50 comprises a continuous single length which is bent in the overall configuration of a digital waveform. As with the frame 12, the slab-support is preferably formed of heat resistant coated metal.

The skeletal frame includes a pair of parallel outer risers 54, 56 which overlie the side panels 14, 16 and extend along axes lying in planes parallel to the planes of the side panels 14, 16. The outer risers 54, 56 include interned lower ends 58, 60 which are inserted through a registered pair of apertures 22 in the side panels 14, 16.

Between the outer risers 54, 56, the rod 50 is bent into a plurality of parallel equidistantly spaced internal risers, 62, 64, 66, 68, 70 and 72, with the upper ends of the risers 54 and 62, 64 and 66, 68 and 70 and 72 and 56 joined by horizontal stays 74.

At the lower end of the inner risers 62, 64, 66, 68, 70 and 72, the rod 50 is bent into perpendicular forwardly projecting tines 76 having upwardly projecting shoulders 78. The shoulders 78 associated with the risers 62 and 66, 66 and 68 and 70 and 72 are joined together by lower horizontal stays 82 to form a plurality of cradles as best illustrated in FIG. 1.

Typical food slabs 80 are illustrated in dashed lines in FIG. 3. Since the bottom of each food slab 80 rests on the tines 76 and shoulders 78, which function as a food slab rest, the length of the food slab 80 may certainly be less than the span between the longitudinal side panels 14, 16, without the slab falling onto the cooking heat source.

From an examination of FIG. 1 and FIG. 6, it will be seen that a notch engaging horizontal post 84 extends from the shoulder 78, associated with the riser 62, toward the outer riser 54. The post 84 includes an interned end portion 86 which extends toward the plane 52. Similarly, a notch engaging horizontal post 88 extends from the shoulder 78, associated with the riser 72, toward the riser 56, with the post 88 having an interned end portion 90.

The horizontal posts 84, 88 are engaged through registered side panel notches 24 associated with the apertures 22 engaged by the food slab support 48. The end portions 86, 90 overly the outer faces of the respective side panels.

Each slab support 48 is mounted on the frame 12 at a slightly rearwardly sloped angle of approximately 10°, as illustrated in FIG. 3 and which slope is fixed by engagement between the posts 84, 88 and the notches 24.

Slab support reinforcement is furnished by a midheight horizontal stringer 92 fixed, as by welding, to the rear surfaces of the risers. A lower horizontal stringer 94 joins the risers to one another at the juncture between each riser and its associated tine 76.

With six sets of apertures 22 and stays 24 in each side panel 14, 16, a cooking rack 10 having six slab supports 48 is provided for simultaneously cooking six slabs 80 of food. The number of slab supports 48 accommodated in the cooking rack 10 can easily be varied by changing the length of the side panels and the number of apertures 22 and associated notches 24.

After slabs of food have been cooked, the cooking rack 10 may be easily disassembled for hand or dishwasher cleaning. To disassemble the cooking rack 10, the side panels 14, 16 are urged toward one another to disengage the interned ends 58, 60 of the outer risers from the apertures 22 and the each slab support 48 is rotated toward the front panel 18, to disengage the horizontal posts 84, 88 from the notches 24.

Figure 7:
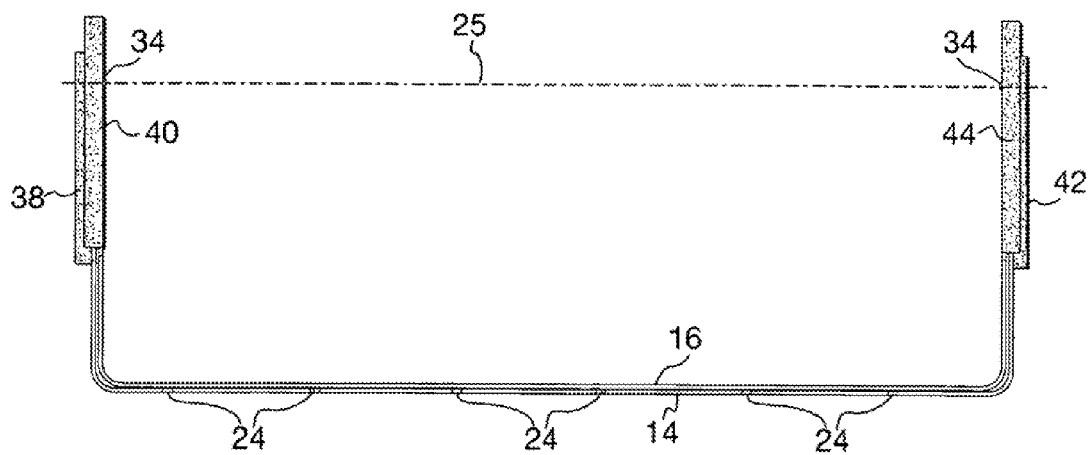
FIG. 7 is a top plan view of the frame in a folded storage position.

It is also significant that with the frame 12 folded to its FIG. 7 position, the slab supports 48 may be nested within an area defined by the end spans and the side panels for compact storage, either within a storage box or container, on a shelf, or in a bin or other storage area.

Thus is will be seen that there is provided a cooking rack which achieves the various aspects, features, and considerations of the present invention and which is well suited to meet the conditions of practical usage.

Since various possible embodiments might be made of the present invention and since various changes might be made in the exemplary embodiment set forth herein without departing from the spirit of the invention, it is to be understood that all matter herein described or shown in the accompanying drawings it to be interpreted as illustrative and not in a limiting sense and that the following claims are to be interpreted in light of the foregoing.

Having thus described the invention, there is claimed as new and desired to be secured by Letters Patent:

1. A cooking rack for simultaneously cooking more than one food slab, the cooking rack comprising:
   a generally rectangular frame including:
      a pair of side panels lying in parallel planes; and
      front and rear panels lying in parallel planes; and
   a plurality of food slab supports removably fixed to the generally rectangular frame, each food slab support lying substantially in a plane perpendicular to the planes of the pair of side panels and being formed of rod,
   wherein each food slab support plane is inclined rearwardly relative to the generally rectangular frame and includes a pair of risers,
   wherein each riser has an axis lying in a plane parallel to the planes of the pair of side panels and has an inturned end portion extending through a plane of a side panel and engaging and being removably fixed relative to its respective side panel,
   wherein each food slab support further includes a food slab rest extending forwardly of the plane of the each food slab support and horizontal posts that are fixed relative to the plane of the each food slab support and positioned forwardly of the plane of the each food slab support,
   wherein a portion of each horizontal post extends through the plane of a side panel forwardly of the plane of the each food slab support, and
   wherein each horizontal post is removably fixed relative to its respective side panel for maintaining the each food slab support in its rearwardly inclined position relative to the generally rectangular frame.

2. The cooking rack according to claim 1,
   wherein each food slab support includes a plurality of food slab rests.

3. The cooking rack according to claim 1,
   wherein each food slab support includes a plurality of internal risers positioned between and parallel to the risers.

4. The cooking rack according to claim 3,
   wherein each food slab support further includes a bent rod configured in a digital waveform.

5. The cooking rack according to claim 3,
   wherein the food slab rest extends from at least one of the plurality of internal risers.

6. The cooking rack according to claim 3,
   wherein the food slab rest comprises tines extending forwardly from the plane of the each food slab support,
   wherein the tines have upwardly bent shoulder portions, the side panel engaging risers, and
   wherein the internal risers and the tines are formed of a single bent rod.

7. The cooking rack according to claim 6,
   wherein the generally rectangular frame further comprises a stay that spans between adjacent sloped shoulder portions.

8. The cooking rack according to claim 6,
   wherein each horizontal post is fixed to a corresponding tine.

9. The cooking rack according to claim 8,
   wherein each horizontal post includes a bent end portion that lies in a plane parallel to the planes of the pair of side panels.

10. The cooking rack according to claim 6,
    wherein the generally rectangular frame further includes a reinforcing horizontal stringer fixed to the single bent rod.

11. A cooking rack for simultaneously cooking more than one food slab, the cooking rack comprising:
    a rectangular frame including a pair of parallel side panels, a front panel, and a rear panel; and
    a plurality of generally planar slab supports removably fixed to the pair of parallel side panels in a rearwardly inclined position, each generally planar slab support including a food slab rest fixed to and extending forwardly from the plane of the each generally planar slab support,
    wherein the food slab rest is adjacent to a lower end of the each generally planar slab support,
    wherein the each generally planar slab support is formed of a bent rod,
    wherein portions of the bent rod extend through a plane of each parallel side panel and engages each parallel side panel,
    wherein each generally planar slab support further includes a pair of laterally extending posts fixed relative to the plane of the each generally planar slab support,
    wherein a portion of each laterally extending post extends through a plane of each parallel side panel and engages its respective parallel side panel forwardly of the plane of the each generally planar slab support.

12. The cooking rack according to claim 11,
    wherein the bent rod is formed with a pair of parallel side panel engaging risers, each parallel side panel engaging riser having an axis lying in a plane parallel to the planes of the plurality of parallel side panels, each parallel side panel engaging riser having an inwardly bent end portion engaged in a parallel side panel, the inwardly bent end portions extending through the plane of each parallel side panel.

13. The cooking rack according to claim 11,
    wherein the food slab rest comprises tines extending forwardly of the plane of the generally planar slab support, the tines having upwardly sloped shoulders, each post being fixed to a tine.

14. A cooking rack for simultaneously cooking more than one food slab, the cooking rack comprising:
    a generally rectangular frame including:
       a pair of side panels lying in parallel planes; and
       front and rear panels lying in parallel planes;
       a first hinge pin extending through overlapped portions of the front panels; and
       a second hinge pin extending through overlapped portions of the rear panels,
       wherein the first and the second hinge pins are coaxial, wherein each side panel and corresponding front and rear panels form a section of the generally rectangular frame, wherein each front panel and each rear panel include an outwardly bent flange to limit rotation of the section around the first and the second hinge pins; and a plurality of food slab supports removably fixed to the generally rectangular frame, each food slab support lying substantially in a plane perpendicular to the planes of the pair of side panels and being formed of rod, wherein each food slab support plane is inclined rearwardly relative to the generally rectangular frame and includes a pair of risers, wherein each riser has an axis lying in a plane parallel to the planes of the pair of side panels and has an inturned end portion extending through a plane of a side panel and engaging and being removably fixed relative to its respective side panel, wherein each food slab support further includes a food slab rest extending forwardly of the plane of the each food slab support and horizontal posts that are fixed relative to the plane of the each food slab support and positioned forwardly of the plane of the each food slab support, wherein a portion of each horizontal post extends through the plane of a side panel forwardly of the plane of the each food slab support, wherein each horizontal post is removably fixed relative to its respective side panel for maintaining the each food slab support in its rearwardly inclined position relative to the generally rectangular frame, and wherein, when the plurality of slab supports are disengaged from the pair of side panels, the sections of the rectangular frame are rotated about the hinge pins to a storage position and the plurality of slab supports are dimensioned to be nested between the front panels and the rear panels with the rectangular frame in the storage position.

15. The cooking rack according to claim 14, wherein each side panel includes a plurality of notches and is in engagement with a notch of each side panel when the cooking rack is in use and being separated from the notch when the frame is in the storage position.

16. The cooking rack according to claim 14, wherein each slab support comprises a bent rod.

17. The cooking rack according to claim 16, wherein the bent rod is configured in a digital waveform.

18. The cooking rack according to claim 17, further comprising a reinforcing stringer being fixed to the bent rod and extending across the bent rod at substantially midheight of the digital waveform.

19. The cooking rack according to claim 17, further comprising a reinforcing stringer fixed to the bent rod and extending across the bent rod adjacent to a lower end of the digital waveform.

\* \* \* \* \*